(12) United States Patent
Baker

(10) Patent No.: US 12,639,638 B2
(45) Date of Patent: May 26, 2026

(54) HALLUCINATION MITIGATION THROUGH MODULAR MODEL ENSEMBLES

(71) Applicant: Balon Inc, Alpharetta, GA (US)

(72) Inventor: Andrew Steven Baker, Griffin, GA (US)

(73) Assignee: Balon Inc., Alpharetta, GA (US)

( * ) Notice: Subject to any disclaimer, the term of this patent is extended or adjusted under 35 U.S.C. 154(b) by 0 days.

(21) Appl. No.: 19/062,786

(22) Filed: Feb. 25, 2025

(65) Prior Publication Data

US 2026/0017572 A1 Jan. 15, 2026

Related U.S. Application Data

(60) Provisional application No. 63/671,384, filed on Jul. 15, 2024.

(51) Int. Cl.
*G06N 20/20* (2019.01)
(52) U.S. Cl.
CPC .................................... *G06N 20/20* (2019.01)
(58) Field of Classification Search
CPC ..................................................... G06N 20/20
USPC .......................................................... 706/10
See application file for complete search history.

(56) References Cited

U.S. PATENT DOCUMENTS

2024/0184988 A1* 6/2024 Sridhar .................. G06F 16/345
2025/0078818 A1* 3/2025 Sridhar .................. G10L 15/16

OTHER PUBLICATIONS

Tonmoy, et al., "A comprehensive survey of hallucination mitigation techniques in large language models", arXiv: 2401.01313v1 [ cs.CL] Jan. 2, 2024 (Year: 2024).*
Rawte, et al., 'A survey of hallucination in "Large Foundation Models"', arXiv: 2309.05922v1 [cs.AI] Sep. 12, 2023 (Year: 2023).*
Ji, et al., "Survey of hallucination in natural language generation", ACM computing surveys, vol. 55, No. 12, Article 248, Mar. 2023 (Year: 2023).*

* cited by examiner

*Primary Examiner* — Tsu-Chang Lee
(74) *Attorney, Agent, or Firm* — Alston & Bird LLP

(57) ABSTRACT

Various embodiments of the present disclosure provide a machine learning request handling technique that improves the functionality of a computer in various aspects. The techniques include receiving a model ensemble prompt request comprising a user identifier and a model prompt. The techniques include generating, based on the user identifier of the model ensemble prompt request, a modular model ensemble that references a plurality of machine learning models. The techniques include generating, based on the model prompt, a plurality of asynchronous model prompts for the plurality of machine learning models, respectively. The techniques include inputting the plurality of asynchronous model prompts to the plurality of machine learning models, respectively, to generate a plurality of candidate model outputs and outputting a model ensemble prompt response that includes a selected output from the plurality of candidate model outputs.

18 Claims, 7 Drawing Sheets

100

102

600

RECEIVE ASYNC CALL 602

GET MODEL LIST 604

GENERATE ASYNCHRONOUS MODEL PROMPTS 606

CALL MODEL LIST WITH ASYNCHRONOUS MODEL PROMPTS 608

RETURN CANDIDATE OUTPUTS 610

700

HALLUCINATION MITIGATION THROUGH MODULAR MODEL ENSEMBLES

CROSS REFERENCE TO RELATED APPLICATIONS

This application claims priority to Provisional Application No. 63/671,384, entitled "DIFFERENTIAL ARCHITECTURE AND SUMMATION-BASED HALLUCINATION MITIGATION USING CONCURRENT MACHINE LEARNING MODELS", filed Jul. 15, 2024, the content of which is incorporated herein by reference in its entirety.

BACKGROUND

Various embodiments of the present disclosure address technical challenges of existing machine learning techniques, including hallucinations introduced by traditional generative machine learning architectures. Contemporary machine learning techniques suffer from fundamental flaws introduced through the use of statistical acceleration, such as autoregressive models. These flaws include the introduction of various levels of hallucinations in which a model deviates from an original instruction set. Hallucinations are difficult to detect and, due to their inaccuracies, limit the usability of machine learning in various fields. Various embodiments of the present disclosure make important contributions to machine learning by addressing these technical challenges, among others.

DETAILED DESCRIPTION

Figure 1:
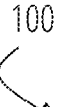
FIG. 1 provides an example overview of an architecture in accordance with some embodiments of the present disclosure.
Figure 1:
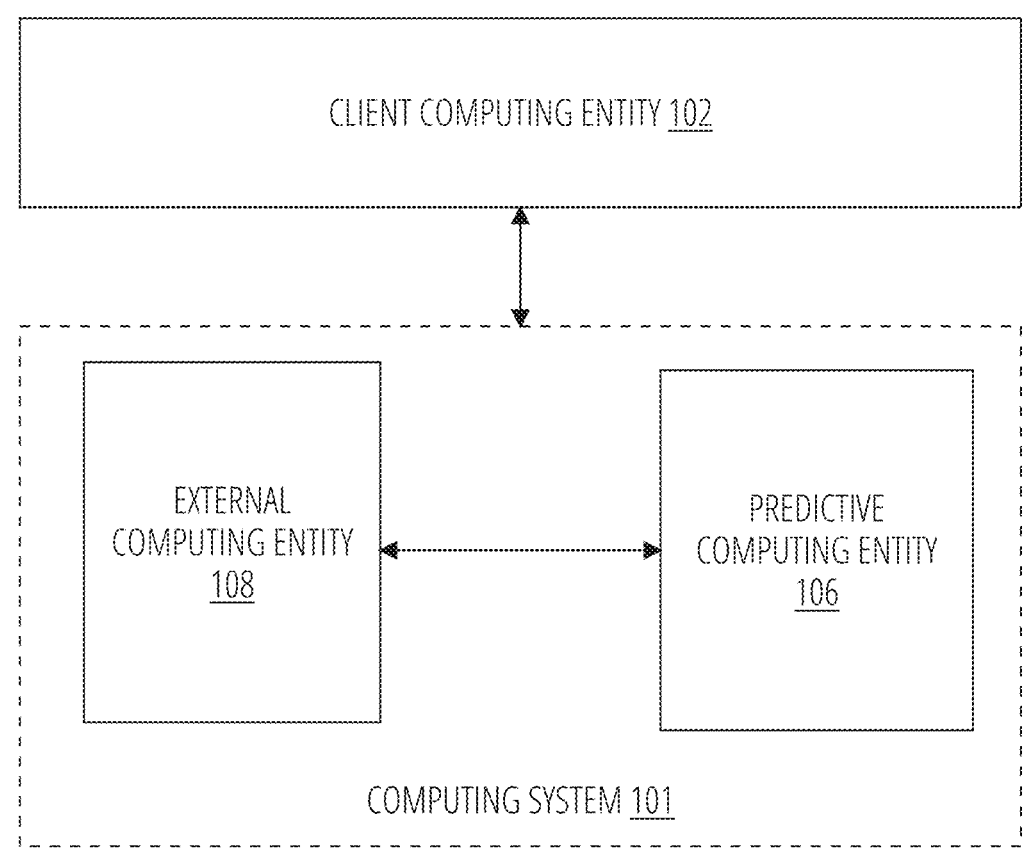

Various embodiments of the present disclosure address technical challenges with machine learning to improve the accuracy of machine learning models relative to traditional approaches. To do so, some embodiments of the present disclosure provide a differential request handling engine and scoring mechanism that collectively receive and process a machine learning prompt to return a response with reduced hallucinations. The request handling engine and scoring mechanism mitigate hallucinations through the use of multiple machine learning models in-tandem and concurrent with one-another to combat internal bias and fault, through the implementation and use of differential engines with diffusion pipelines. By leveraging multiple different models and/or instances thereof, the differential request handling engine and scoring mechanism may combat bias in training data and/or instruction sets through the use of a multi-model grading protocol in which each of the models vote (e.g., grading system) on an optimal machine learning response. By doing so, the techniques of the present disclosure expand upon traditional self-reflection approaches by introducing a new voting mechanism in which input is synthesized from a plurality of models defined for a particular request. This, in turn, improves the accuracy of machine learning models by reducing hallucinations, among other advantages.

In some embodiments of the present disclosure, a model ensemble prompt request is received that includes a model prompt for a generative machine learning model. To handle the request, the differential request handling engine may adaptively construct a modular model ensemble that is tailored to the request. The modular model ensemble may define each of a plurality of different models as nodes that may be interconnected to facilitate voting across each of the models within the modular model ensemble. For instance, each node may include a machine learning model, a candidate output produced by the machine learning model, and a series of candidate output scores generated by each model defined within the modular model ensemble. In this manner, the modular model ensemble may be dynamically updated, at run time, to adapt to a user. This enables, modular model ensembles that are request specific, such that the models designated by a request may participate in a voting scheme constructed and approved by a particular user. By doing so, the differential request handling engine may interpret, through insights polled from a plurality of connected models, the quality of a candidate output from each a plurality of models and output a selected output of the best quality. In this way, a plurality of models may be concurrently executed to generate a hallucination-critical prompt response that may be more accurate, consistent, and relevant than traditional, single model solutions.

Examples of technologically advantageous embodiments of the present disclosure include improved machine learning techniques, among other aspects of the present disclosure. Other technical improvements and advantages may be realized by one of ordinary skill in the art.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form, such as object code, or may be first transformed into another form, such as by compiling source code. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing one or more software components comprising application(s), program (s), program module(s), script(s), source code and/or compiler(s) for generating executable instructions such as object code using the source code, program code, object code, byte code, compiled code, interpreted code, machine code, executable instructions, and/or the like (e.g., executable instructions, instructions for execution, computer program products, program code, and/or similar terms used herein interchangeably). Such non-transitory computer-readable storage media include all computer-readable storage media (including volatile and non-volatile media).

A non-volatile computer-readable storage medium may include one or more magnetic and/or electro-mechanical storage devices, such as floppy disk(s), hard disk(s), magnetic tape, punch card(s), paper tape(s), optical mark sheet(s) (or any other physical medium with patterns of holes or other optically or mechanically detectable indicia), any other non-transitory magnetic medium, and/or the like. A non-volatile computer-readable storage medium may additionally or alternatively include one or more optical storage devices, such as compact disc read only memory (CD-ROM), compact disc-rewritable (CD-RW), any other non-transitory optical medium, and/or the like. A non-volatile computer-readable storage medium may additionally or alternatively include one or more read-only memory (ROM); programmable read-only memory (PROM); erasable programmable read-only memory (EPROM); electrically erasable programmable read-only memory (EE-PROM), such as flash memory; and/or the like. In some examples, flash memory may comprise a set of field effect transistors and/or other devices or circuitry that implement serial and/or parallel NAND, NOR, and/or other hardware logic for storing data. In some examples, solid state storage (SSS), such as a solid state drive (SSD), flash drive, solid-state hybrid drives (SSHDs), and/or the like may include flash memory (SSHDs are a hybrid device that may include a hard disk and flash memory in some examples); and, in some examples, flash memory may be used as cache memory, implemented as a basic input output system (BIOS) chip or part of a BIOS chip, and/or the like. A non-volatile computer-readable storage medium may additionally or alternatively include 3D XPoint memory, non-volatile random access memory (NVRAM) (e.g., bridging random access memory (CBRAM), phase-change random access memory (PRAM), magnetoresistive random access memory (MRAM), ferroelectric random-access memory (FeRAM)), racetrack memory, and/or the like. A non-volatile computer-readable storage medium may additionally or alternatively include one or more thermo-mechanical storage devices, such as Millipede memory; one or more molecular memory repositories; and/or the like.

A volatile computer-readable storage medium may include random access memory (RAM), dynamic random access memory (DRAM), static random access memory (SRAM), synchronous dynamic random access memory (SDRAM), cache memory (including various levels), register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may additionally or alternatively be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may additionally or alternatively take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 provides an example overview of an architecture 100 in accordance with some embodiments of the present disclosure. The architecture 100 includes a computing system 101 configured to receive a request, such as a model ensemble prompt request, and/or the like, from client computing entities 102, process the request, and provide responses to the client computing entities 102. The example architecture 100 may be used in a plurality of domains and is not limited to any specific application as disclosed herewith. The plurality of domains may include industrial, manufacturing, computer security, to name a few.

In accordance with various embodiments of the present disclosure, one or more machine learned models may be trained to generate candidate outputs, candidate output scores, and/or other machine learned outputs. The models may be adapted to a differential request handling engine and/or complementary scoring mechanism that may collectively process a request using a modular model ensemble. Some techniques of the present disclosure may adapt traditional models to a cohesive framework, such as the modular model ensemble, for more efficiently handling portions of the request handling process.

In some embodiments, the computing system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may include a predictive computing entity 106 and one or more external computing entities 108. The predictive computing entity 106 and/or one or more external computing entities 108 may be individually and/or collectively configured to receive requests from client computing entities 102, process the requests to generate responses, and provide the responses to the client computing entities 102.

For example, as discussed in further detail herein, the predictive computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data processing and/or training tasks. The storage subsystem may include one or more storage units, such as multiple distributed storage units that are connected through a computer network. A storage unit in the respective computing entities may store at least one of one or more data assets and/or a set of data about the computed properties of one or more data assets. Moreover, each storage unit in the storage systems may include one or more non-volatile storage or volatile storage media similar to or different than the non-volatile and/or volatile computer-readable storage media discussed above.

In some embodiments, the predictive computing entity 106 and/or one or more external computing entities 108 are communicatively coupled using one or more wired and/or wireless communication techniques. The respective computing entities may be configured according to the techniques described herein to perform one or more operations of one or more techniques described herein. By way of example, the predictive computing entity 106 may be configured to train, implement, use (e.g., execute an inference operation(s)), update (e.g., fine-tune), and evaluate machine learned models in accordance with one or more training and/or inference operations of the present disclosure. In some examples, the external computing entities 108 may be configured to train, implement, use, update, and evaluate machine learned models in accordance with one or more training and/or inference operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., request handling, scoring techniques) described herein. The external computing entities 108, for example, may include and/or be associated with one or more entities that may be configured to receive, transmit, store, manage, and/or facilitate datasets, and/or the like. The external computing entities 108, for example, may include data sources that may provide such datasets, and/or the like to the predictive computing entity 106 which may leverage the datasets to perform one or more steps/operations of the present disclosure, as described herein. In some examples, the datasets may include an aggregation of data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for an information domain.

In some example embodiments, the predictive computing entity 106 may be configured to receive a trained machine learned model trained and subsequently provided by the one or more external computing entities 108. For example, the one or more external computing entities 108 may be configured to perform one or more training steps/operations of the present disclosure to train a machine learned model, as described herein. In such a case, the trained machine learned model may be provided to the predictive computing entity 106, which may leverage the trained machine learned model to perform one or more inference steps/operations of the present disclosure. In some examples, feedback (e.g., evaluation data, ground truth data) from the use of the machine learned model may be recorded by the predictive computing entity 106. In some examples, the feedback may be provided to the one or more external computing entities 108 to continuously train the machine learned model over time. In some examples, the feedback may be leveraged by the predictive computing entity 106 to continuously train the machine learned model over time. In this manner, the computing system 101 may perform, via one or more combinations of computing entities, one or more prediction, training, and/or any other machine learned-based techniques of the present disclosure.

A. Example Predictive Computing Entity

Figure 2:
FIG. 2 provides an example predictive data analysis computing entity in accordance with some embodiments of the present disclosure.
Figure 2:
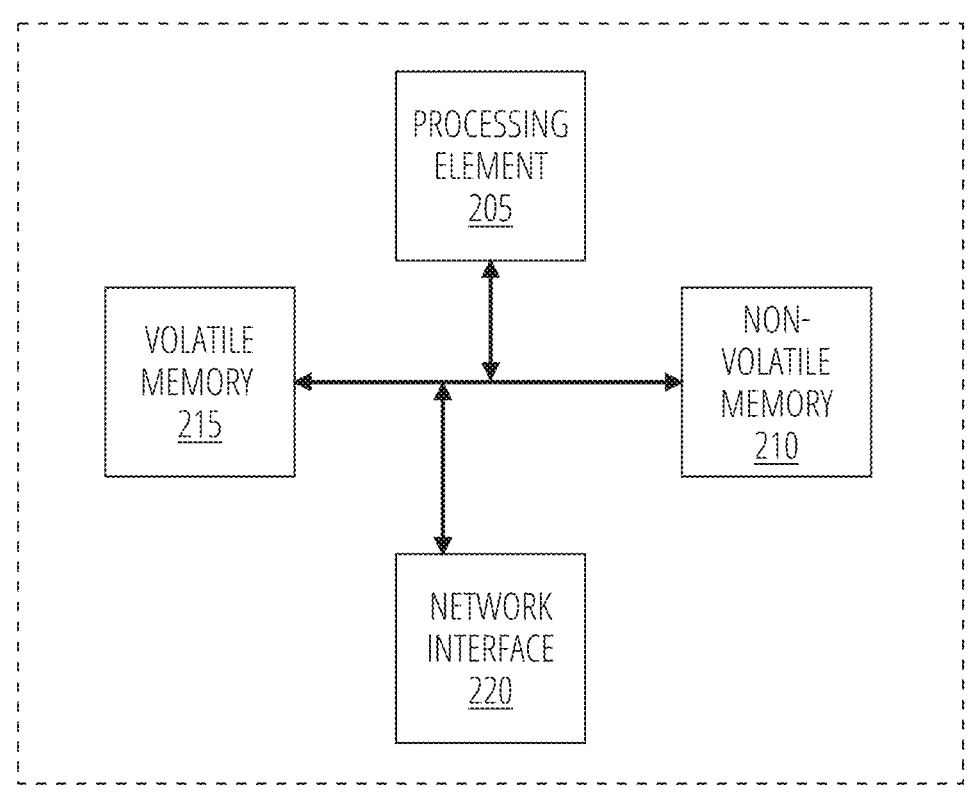

FIG. 2 provides an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learned models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive computing entity 106) may train and use one or more machine learned models described herein. In other embodiments, a first computing entity (e.g., predictive computing entity 106, which may be one or more predictive computing entities) may use one or more machine learned models that may be trained by a second computing entity (e.g., external computing entity 108) communicatively coupled to the first computing entity. The second computing entity, for example, may train one or more of the machine learned models described herein, and subsequently provide the trained machine learned model(s) (e.g., optimized weights, code sets) to the first computing entity over a network.

As shown in FIG. 2, in some embodiments, the computing entity 200 may include, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, arithmetic logic units (ALUs) (e.g., which may be part of one or more graphics processing units (GPUs), tensor processing units (TPUs), and/or the like), coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Examples of a combination of hardware and computer program products include application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further include, or be in communication with, non-transitory computer readable media, such as non-volatile media (also referred to as non-volatile storage, memory, memory storage, memory circuitry, and/or similar terms used herein interchangeably) and/or volatile media (also referred to as volatile storage, memory, memory storage, memory circuitry, and/or similar terms used herein interchangeably), as discussed above.

As will be recognized, the non-volatile media and/or volatile media may store respective part(s) of one or more databases, database instances, database management systems, data, applications, programs, program modules, scripts, code (e.g., source code, object code, byte code, compiled code, interpreted code, machine code) that embodies one or more machine learned models or other computer functions described herein, executable instructions, and/or the like being executed by, for example, the processing element 205. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

Thus, the databases, database instances, database management systems, data, applications, programs, program modules, code (source code, object code, byte code, compiled code, interpreted code, machine code) that embodies one or more machine learned models or other computer functions described herein, executable instructions, and/or the like may be used to control certain aspects of the operation of the computing entity 200 by operating the processing element 205 according to software component(s) retrieved from any of the computer-readable storage media and executed by the processing element 205.

As indicated, in some embodiments, the computing entity 200 may also include one or more network interfaces 220 for communicating with various computing entities (e.g., the client computing entity 102, external computing entities), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learned models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, IEEE 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may additionally or alternatively include, or be in communication with, one or more input elements/devices, such as input sensor(s). In some examples, the input sensor(s) may include one or more keyboards, pointing devices (e.g., mouse, trackpad), touch screens, cameras (e.g., infrared light camera, visual light camera), depth sensors (e.g., LIDAR, radar, stereo cameras), gyroscopes, location sensors (e.g., global positioning system (GPS), Hall effect sensor, laser doppler vibrometer), microphones, and/or the like. The computing entity 200 may additionally or alternatively include, or be in communication with, one or more output elements/devices (not shown), such as one or more speakers, visual display devices, haptic feedback devices, motion devices (e.g., electromechanically actuated devices), and/or the like.

B. Example Client Computing Entity

Figure 3:
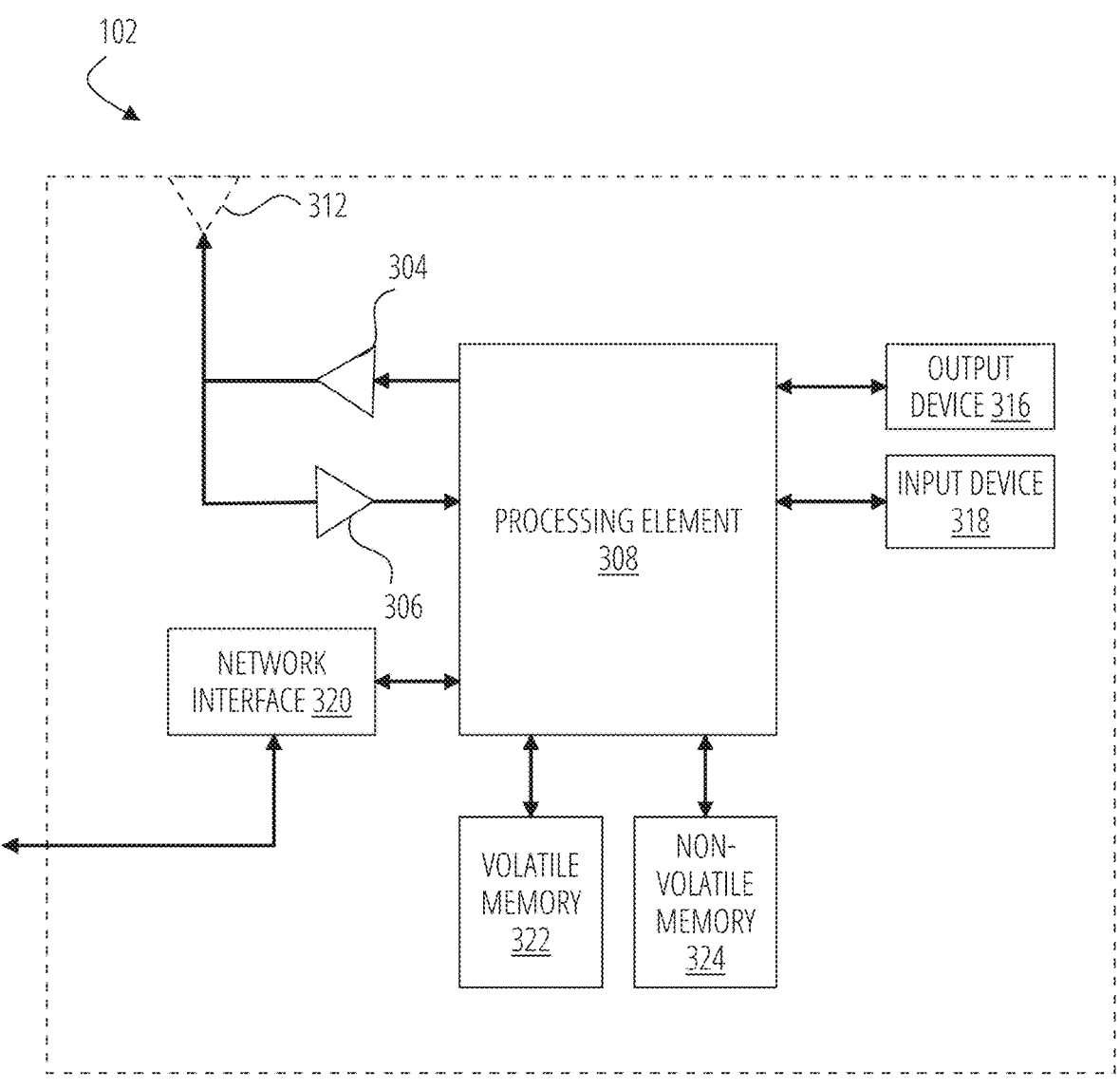
FIG. 3 provides an example client computing entity in accordance with some embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with one or more wireless and/or wired communication standards and protocols, such as those described above with regard to the computing entity 200.

The client computing entity 102 may additionally or alternatively download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location component adapted to acquire, for example, latitude, longitude, altitude, geocode, course, direction, heading, speed, universal time (UTC), date, and/or various other information/data. In some embodiments, the location component may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include an output device 316 (e.g., similar to or different than the output device(s) 2xx discussed above)) coupled to a processing element 308 and/or a user input device (e.g., an input sensor(s), similar to or different than the input sensor(s) 2xx discussed above) coupled to the processing element 308. In some examples, the user interface may additionally or alternatively comprise software component(s) executed by the processing element 308 to present (e.g., audibly, visually, tactilely) via an input and/or output device and/or a software endpoint such as an application programming interface (API) or exposed software function a graphical user interface (GUI) (e.g., at least a portion of a user application, browser), command-line interface, touch and/or haptic user interface, gesture and/or image capture-based interface, voice/audio user interface, and/or the like used herein interchangeably executing on and/or accessible via the client computing entity 102 to interact with and/or cause display of information/data from the computing entity 200, as described herein. In addition to providing input, the user input interface may be used, for example, to activate, deactivate, and/or modify certain functions, such as altering a power or operating state of the client computing entity 102, the computing system 101, the predictive computing entity 106, and/or the external computing entity 108.

The client computing entity 102 may further include, or be in communication with, non-transitory computer readable media, such as non-volatile media (also referred to as non-volatile storage, memory, memory storage, memory circuitry, and/or similar terms used herein interchangeably) and/or volatile media (also referred to as volatile storage, memory, memory storage, memory circuitry, and/or similar terms used herein interchangeably), as discussed above.

As will be recognized, the non-volatile media and/or the volatile media may store respective part(s) of one or more databases, database instances, database management systems, data, applications, programs, program modules, scripts, code (e.g., source code, object code, byte code, compiled code, interpreted code, machine code) that embodies one or more machine learned models or other computer functions described herein, executable instructions, and/or the like being executed by, for example, the processing element 205. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In another embodiment, the client computing entity 102 may include one or more components or functionalities that are the same or similar to those of the computing entity 200, as described in greater detail above. In one such embodiment, the client computing entity 102 downloads, e.g., via network interface 320, code embodying machine learned model(s) from the computing entity 200 so that the client computing entity 102 may run a local instance of the machine learned model(s). As will be recognized, these architectures and descriptions are provided for example purposes only and are not limited to the various embodiments.

In various embodiments, the client computing entity 102 may be embodied as an artificial intelligence (AI) computing entity (e.g., an intelligent agent machine-learned model), such as AutoGPT, Mycroft, Rhasspy, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage component, and/or or accessible over a network. In various embodiments, the AI computing entity may be configured to retrieve and/or execute one or more of the predefined program algorithms upon the occurrence of a predefined trigger event.

III. Example System Operations

Figure 4:
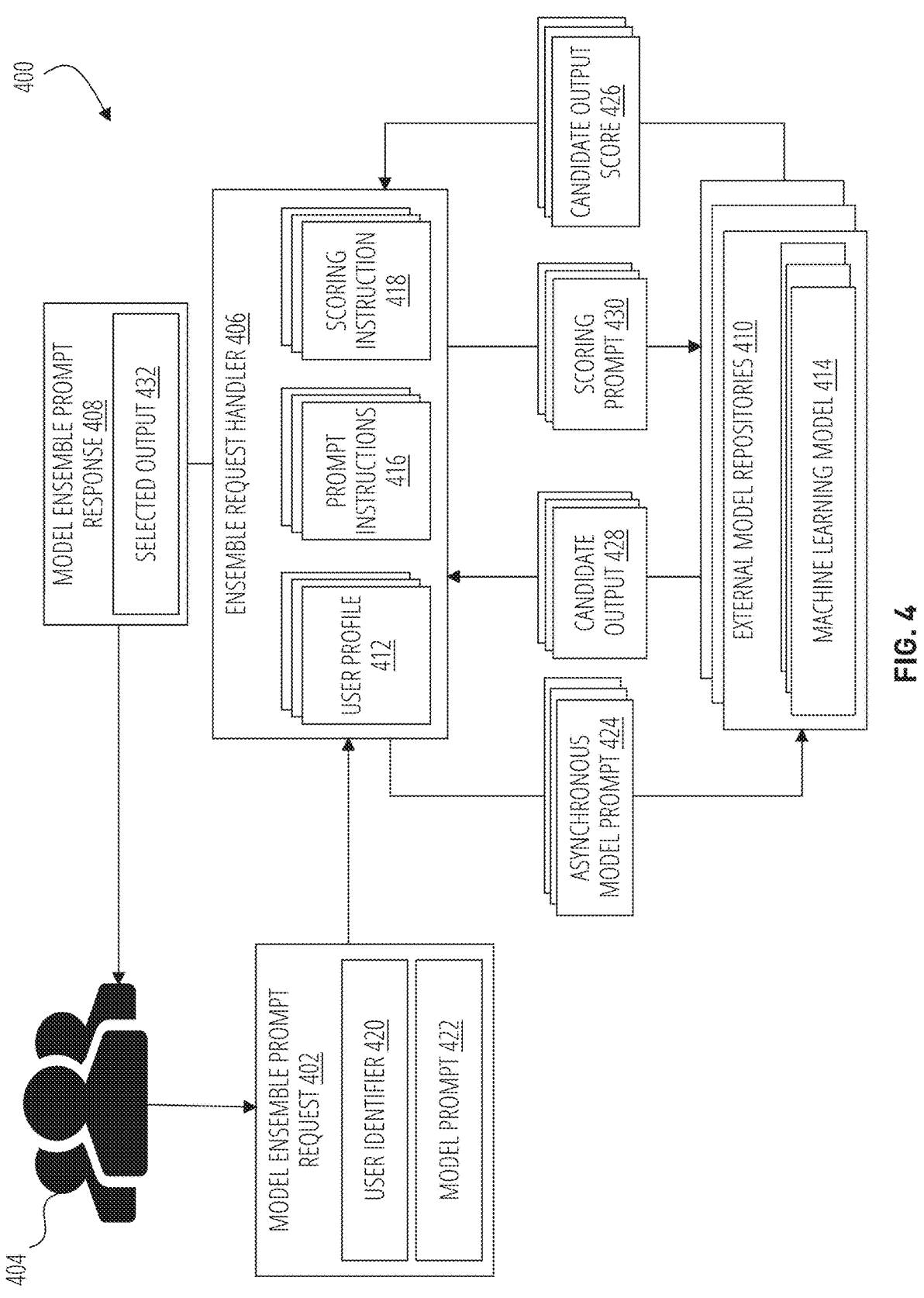
FIG. 4 is a dataflow diagram of a differential request handling engine in accordance with some embodiments of the present disclosure.

FIG. 4 is a dataflow diagram 400 of a differential request handling engine in accordance with some embodiments of the present disclosure. The differential request handling engine mitigates technical challenges with traditional machine learning models by leveraging a statistical approach with an added layer of recursion and redundancy. To do so, the differential request handling engine synthesizes one pipeline, a modular model ensemble, from a plurality of machine learning models 414 that may be used to synthesize outputs from the plurality of machine learning models 414 for critical analysis, balance, and alignment. By doing so, the differential request handling engine expands self-reflection techniques by incorporating machine learning-based self-reflection as a node in a modular model ensemble. For example, each node (e.g., machine learning model 414) of the modular model ensemble may be staged/introduced to facilitate a model ensemble prompt request 402 by first generating a candidate output and then scoring the candidate outputs 428 generated by each node of the modular model ensemble. In this way, each node may include a candidate output along with a list of embedded candidate output scores 426 (e.g., decimal, float value), derived from all of the models staged in the modular model ensemble. The candidate output scores 426 may include a series list from a plurality of differential models (e.g., and/or a mean/fmean value derived from said list), where the aggregated candidate output score may include an average, summation, and/or the like of all scores synthesized for a particular candidate output. In this manner, a plurality of machine learning models 414 may be polled to both (1) contribute a candidate output and (2) score the candidate outputs 428 from itself and each of the plurality of machine learning models 414. This, in turn, enables a diverse set of performance metrics for comprehensible analysis and selection of a selected output 432 for a model ensemble prompt request 402, which ultimately improves the performance of generative machine learning by filtering outputs based on hallucinations detected across a plurality of voting, democratized, machine learning models of the modular model ensemble.

In some embodiments, a model ensemble prompt request 402 is received by an ensemble request handler 406. The model ensemble prompt request 402, for example, may include an API call to the ensemble request handler 406. The ensemble request handler 406 may include a computing service, process, and/or the like, that may be executed one or more remote and/or local computing resources. In some examples, the ensemble request handler 406 may include at least a portion of a remote service (e.g., a remote server, workspace, etc.) and the model ensemble prompt request 402 may be received, via an interface (e.g., plug-in, web interface) associated with the remote service, from a client computing device. The model ensemble prompt request 402, for example, may be initiated by a user 404.

In some embodiments, the model ensemble prompt request 402 includes a user identifier 420, a model prompt 422, and/or one or more contextual request attributes. The user identifier 420 may include one or more numeric, alpha-numeric, and/or the like characters that uniquely identify a user 404 (and/or a session for a guest) to the ensemble request handler 406. In some examples, the user identifier 420 may correspond to a user profile 412 that may be previously configured for and/or by the user 404. In addition, or alternatively, the user identifier 420 may identify an absence of a user profile 412 and a user 404 may be prompted to input data for configuring the user profile 412.

The user profile 412 may include one or more user-specific criteria for facilitating a model ensemble prompt request 402. The user-specific criteria, for example, may include a list of accessible machine learning models 414 (e.g., that a user have a subscription for). For instance, the user-specific criteria may identify a user privilege level for each of a plurality of machine learning models 414 hosted by one or more external model repositories 410. In addition, or alternatively, the user profile 412 may identify a particular set (e.g., a default set) of machine learning models 414 for generating a modular model ensemble. In some examples, the particular set of machine learning model 414 may be preselected by toggling a machine learning model 414 on/off within the user profile 412.

In some examples, the one or more user-specific criteria may include a set of prompt instructions 416 and/or scoring instructions 418.

The set of prompt instructions 416 may include one or more preselected (and/or default) prompt instructions 416 for a facilitating a model prompt 422. The prompt instructions 416, for example, may include one or more role-based instructions, such as system and/or assistant instructions, which may inform one or more attributes of a machine learning model's candidate output 428. By way of example, for an example user profile 412, a system-based instruction may include the following: "You are a research tool. Answer to the fullest extent of your ability, in a way consistent with standardized protocol and respectful to many." As another example, for an example user profile 412, an assistant-based instruction may include the following: "Limit the candidate output to one to two paragraphs." In some examples, assistant-based and/or system-based instructions may be preselected from a candidate set of assistant-based and/or system-based instructions for a user profile 412. In addition, or alternatively, the prompt instructions 416 may be manually entered by a user 404 and stored in association with the user profile 412.

The set of scoring instructions 418 may include one or more preselected (and/or default) scoring instructions 418 for facilitating a concurrent scoring mechanism, as described herein. In some examples, the scoring instruction 418 may be preselected from a candidate set of scoring instructions 418. In addition, or alternatively, the scoring instructions 418 may be manually entered by a user 404 and stored in association with the user profile 412.

The model prompt 422 may include generative model prompt, such as a no-shot prompt, a few-shot prompt, and/or the like. For instance, the model prompt 422 may include one or more text segments, image data, and/or any other medium of information that describes a request for a generative response. A model prompt 422, for example, may include a request (e.g., a request to answer a question, a request to expand on an answer) and/or contextual information for the request. The contextual information may reflect one or more formatting and/or answer examples, background information, target searching domain, and/or the like.

In some embodiments, a modular model ensemble is generated based on the user identifier 420 of the model ensemble prompt request 402. The modular model ensemble may include a data structure with references a plurality of machine learning models 414 from one or more external model repositories 410. The modular model ensemble, for example, may include a machine learning model list that describes a list of models and/or an order in which the models may be called to facilitate a model ensemble prompt request 402. In addition, or alternatively, the modular model ensemble may form a graph data structure, in which each of the plurality of machine learning models 414 are defined as nodes that are connected to one another. In some examples, each model of the modular model ensemble may be called asynchronously to independently generate a plurality of candidate outputs 428. In this manner, the modular model ensemble may form a differential architecture (using multiple machine learning models 414) in a concurrent machine learning solution.

In some embodiments, a machine learning model 414 is a hardware and/or software architecture having one or more parameters (e.g., coefficient(s), weight(s), base(s), activation function(s) and/or action function type(s) in examples where the activation function and/or function type is determined as part of training, clustering centroid(s)/medoid(s), partition (s)) determined as a result of training the machine learning model 414 based on training hyperparameters and/or structural hyperparameters defining the model's architecture. In some examples, structural hyperparameter(s) may define component(s) of the model's architecture and/or their configuration/order, such as, for example, the configuration/order specifying which output(s) of one component are provided as input to other component(s); a number, type, and/or configuration of component(s) per layer, a number of layers of the model, a number of input nodes in an input layer of the model, a number of output nodes of an output layer of the model, component dimension (e.g., input size versus output size), temperature, and/or the like. The component(s) of the model may comprise one or more activation functions and/or activation function type(s) (e.g., gated linear unit (GLU), such as a rectified linear unit (ReLU), leaky RELU, Gaussian error linear unit (GELU), Swish, hyperbolic tangent), one or more attention mechanism and/or attention mechanism types (e.g., self-attention, cross-attention), and/or various other component(s) (e.g., adding and/or normalization layer, pooling layer, filter). Various combinations of any these components (as defined by the structural hyperparameter(s)) may result in different types of model architectures, such as a transformer-based machine-learned model (e.g., embedding model(s), generative pre-trained transformer(s) (GPT(s))), neural network(s), multi-layer perceptron(s), Kolmogorov-Arnold network(s), clustering algorithm(s), support vector machine(s), etc.

The modular model ensemble may include a plurality of different machine learning models 414, a plurality of instances of one or more different machine learning models, and/or a combination thereof. For instance, multiple instances of the same machine learning model 414 may be staged with differing prompt instructions 416 to create a counterbalanced matrix derived from a differential engine even with one machine learning model 414. The modular model ensemble may support any and/or any number of machine learning models 414.

In some examples, the user identifier 420 corresponds to a user profile 412 that identifies a user privilege level for each of the plurality of machine learning models 414 and the modular model ensemble is generated based on the user privilege level. For example, as described herein, a user profile 412 (and/or user identifier 420) may include (and/or correspond to) a model list that is accessible to a user 404. The model list may include a plurality of machine learning models 414 that the user 404 is subscribed to. For instance, a user privilege level may describe an access level of a user 404 with respect to a particular model. In some examples, the user privilege level may identify one or more accessibility constraints. For instance, the accessibility constraints may define a threshold number requests (e.g., daily, weekly, monthly, static call limits) for a particular machine learning model. In some examples, the one or more accessibility constraints may be tracked by a user profile 412 and a machine learning model 414 may be validated based on a comparison between the historical usage of a user 404 and the accessibility constraints. In addition, or alternatively, a machine learning model 414 may be validated based on a response time of the machine learning model 414 and/or one or more other error handling techniques. If validated, a machine learning model 414 may be added to a modular model ensemble. Otherwise, the machine learning model 414 may be removed from the modular model ensemble.

In some embodiments, a plurality of asynchronous model prompts 424 is generated for the plurality of machine learning models 414 of the modular model ensemble, respectively. Each asynchronous model prompt 424 may be generated based on the model prompt 422 from the model ensemble prompt request 402. In some examples, the plurality of asynchronous model prompts 424 may be provided to the plurality of machine learning model 414 via an asynchronous, concurrent prompting technique, an operational example of which is provided with reference to FIG. 5.

In some embodiments, the plurality of asynchronous model prompts 424 is input to the plurality of machine learning models 414, respectively, to generate a plurality of candidate outputs 428. For example, the ensemble request handler 406 may execute a scalar method of concurrent, local (and/or remote) API calls, which may be equivalent in total to the number of models enabled in a user profile 412, or effective staging ground as defined by the model ensemble prompt request 402. The formula is as follows, where the total number of models (P) is squared and added back to the principal number of models (P).

$$\left(P^2\right) + P$$

The ensemble request handler 406 may provide the requests from the point of when it receives the model ensemble prompt request 402 by duplicating the model prompt 422 internally and augmenting the duplicated model prompt 422 with the prompt instructions 416 identified by the model ensemble prompt request 402. In this manner, a plurality of asynchronous model prompts 424 may be generated and provided to a plurality of machine learning models 414 to receive a plurality of candidate outputs 428 for the model ensemble prompt request 402. In some examples, the ensemble request handler 406 may asynchronously prompt the plurality of machine learning models 414 to handle and/or compensate for one or more model failures in real time. For instance, by asynchronously prompting the plurality of machine learning models 414, the ensemble request handler 406 may detect timeouts, or other model errors, and through local error handling via logic gates, disable the models to eliminate collective failover and the common single point of failures that traditionally plague related systems.

In some embodiments, a model ensemble prompt response 408 is output that includes a selected output 432 from the plurality of candidate outputs 428. The model ensemble prompt response 408 may be specific to the model ensemble prompt request 402. By way of example, the plurality of machine learning models 414 may include a first plurality of machine learning models 414. In some examples, another model ensemble prompt request may be received with another user identifier different than the user identifier 420. The ensemble request handler 406 may generate, based on the other user identifier, another modular model ensemble that references a second plurality of machine learning models different than the first plurality of machine learning models 414 and output another model ensemble prompt response including a selected output from another plurality of candidate outputs respectively generated by the second plurality of machine learning models. In this way, a model ensemble prompt response 408 may be tailored to the models identified by a model ensemble prompt request 402, resulting in different selected outputs 432 depending on the models accessible to a particular user 404 and/or identified by the user 404 in the model ensemble prompt request.

In some embodiments, the selected output 432 is selected from the candidate outputs 428 based on a plurality of candidate output scores 426. For example, a plurality of candidate output scores 426 may be generated for each of the candidate outputs 428 using the plurality of machine learning models 414. Each candidate output score 426, for example, may be generated based on a scoring prompt 430. In some examples, a plurality of scoring prompts 430 may be provided to the plurality of machine learning models 414 via an asynchronous, concurrent prompting technique, an operational example of which is provided with reference to FIG. 5.

The concurrent prompting techniques may implement a concurrent scoring mechanism that is a language agnostic, wholly asynchronous, and built upon the nodes of the modular model ensemble. For example, each node may include an internal request to generate candidate output using a machine learning model and then score the candidate outputs 428 from each the plurality of machine learning models 414 respectively corresponding to the nodes of the modular model ensemble. In this way, the modular model ensemble introduces both the candidate outputs 428 and machine learning models 414 to a collective staging ground, where the collective pair (model+output) is graded asynchronously by all of the models present. A final confidence rating (or aggregated candidate output score) may be found by:

$$\frac{\sum T}{P}$$

where T is the list of candidate output scores 426 from synthesized outputs, and P is the principal number of machine learning models 414. In this manner, the modular model ensemble may provide a machine learning architecture that concurrently sends requests for self-reflection and self-validation, through the associated staging ground and use of embedded matrices from autoregressive models. By doing so in a differential and concurrent manner, the modular model ensemble yields greater results on average, as well as exponentially improving speed and return-trip timeframe.

In some embodiments, each scoring prompt 430 is generated based on a particular candidate output 428. For example, the scoring prompt 430 may include a set of scoring instructions 418, the candidate output 428, and/or one or more scoring attributes. For instance, the scoring prompt 430 may include model data that identifies a model name, a model type, and/or the like associated with a machine learning model 414 that outputs the candidate output 428.

In some embodiments, the set of scoring instructions 418 include scoring criteria for evaluating the performance of a machine learning model 414 with respect to a candidate output 428. The set of scoring instructions 418, for example, may include one or more criteria for measuring a hallucination level reflected by the candidate output 428. In addition, or alternatively, the set of scoring instructions 418 may include criteria for measuring a clarity, informativeness, and/or the like of the candidate output 428. The criteria may be set by a user 404 based on the user's preferences for a selected output 432.

By way of example, a scoring prompt 430 may include the following set of scoring instructions 418: "Grade this output as a classifier in a manner to return a float type value" and a candidate output may be provided as material to be scored. In some examples, the candidate output 428 and/or the set of scoring instructions 418 may be augmented to include model data (e.g., to notify a model that it did or did not generate the candidate output 428).

In some examples, the set of scoring instructions 418 may be provided and/or identified by the model ensemble prompt request 402. For instance, the scoring instructions 418 may be included in the model ensemble prompt request 402. In addition, or alternatively, the set of scoring instructions 418 may include a set of predefined scoring instructions 418 that are identified by the model ensemble prompt request 402. By way of example, the set of scoring instructions 418 may correspond to preselected scoring instructions 418 that are associated with the user identifier 420 (e.g., stored in association with a user profile 412).

In some embodiments, a scoring prompt 430 for a candidate output 428 is provided to each of the plurality of the machine learning models 414 of the modular model ensemble to generate a plurality of candidate output scores 426 for a candidate output 428. Each of the candidate output scores 426 may include a numerical value. The plurality of candidate output scores 426 may be aggregated to generate an aggregated candidate output score for the candidate output 428. The selected output 432 may be selected based on a comparison between the aggregated candidate output score and a plurality of aggregate candidate output scores respectively corresponding to the plurality of candidate outputs. For instance, the selected output 432 may include the candidate output 428 associated with the highest aggregated candidate output score.

The concurrent scoring mechanism may depend on the number of machine learning models toggled (e.g., identified) by a model ensemble prompt request 402. By way of example, with two machine learning models toggled, the concurrent scoring mechanism may return: [{candidate output 1}, {model}, crm=[val1, val2]], [{candidate output 2}, {model}, crm=[val1, val2]], whereas with three machine learning models toggled the concurrent scoring mechanism may return: [{candidate output 1}, {model}, crm=[val1, val2, val3]], [{candidate output 2}, {model}, crm=[val1, val2, val3]], [{candidate output 3}, {model}, crm=[val1, val2, val3]]. In these examples, "crm" may refer to a confidence rating (e.g., candidate output score 426). As illustrated, the number of confidence ratings (e.g., candidate output scores 426) for each candidate output 428 may be equivalent to the total number of models enabled for a particular model ensemble prompt request 402. In some examples, an aggregated candidate output score may include a summation-based hallucination mitigation score that is aggregated from the plurality of confidence ratings (e.g., candidate output score 426), such that the aggregated candidate output scores for each candidate output may be given by $(\Sigma(m))^2$, where m is an enabled ML model. In some embodiments, the candidate outputs 428 may be sorted to prioritize what is commonly considered "most accurate" to a zero-index and the highest sorted candidate output 428 may be selected as the selected output 432.

Figure 5:
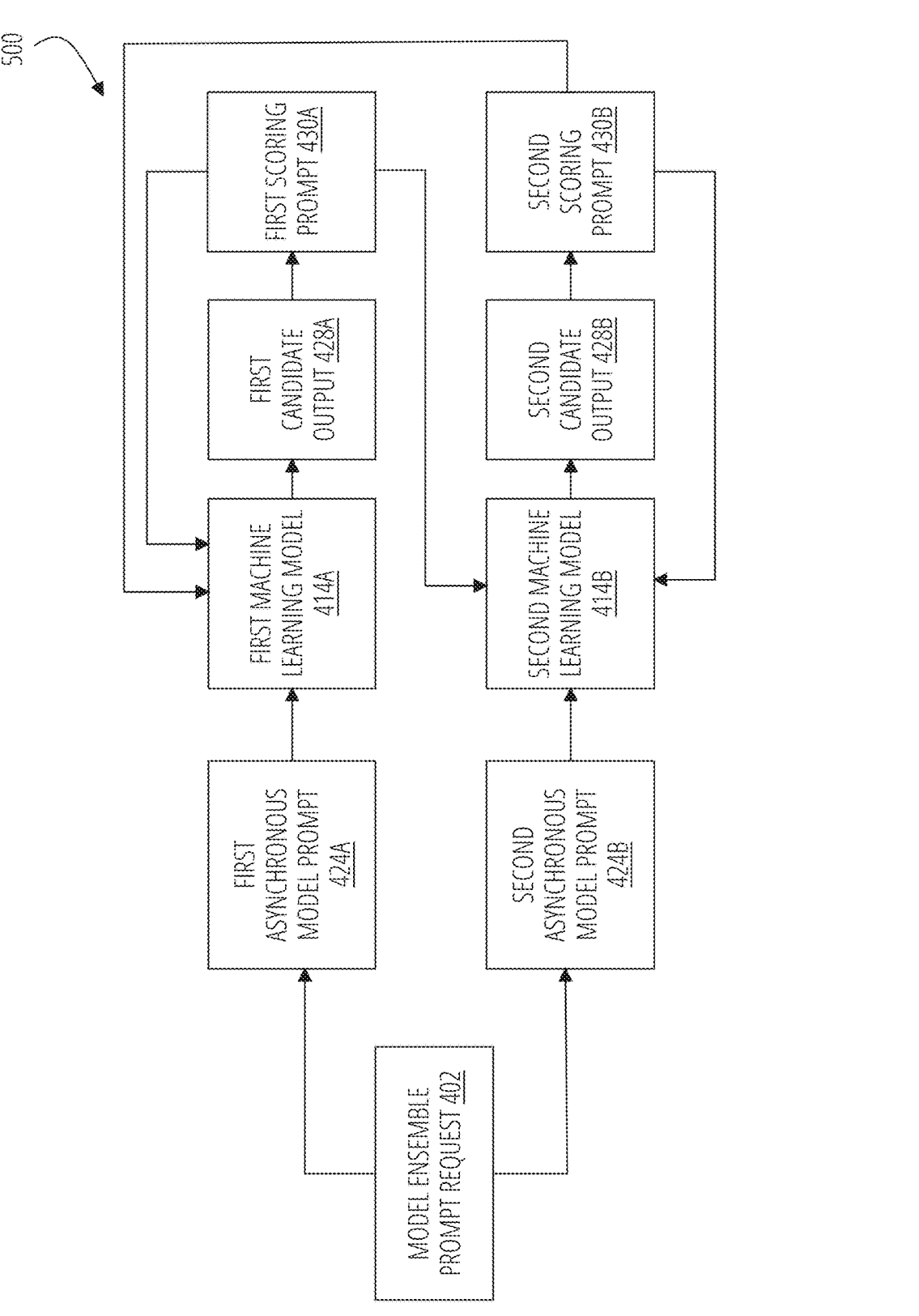
FIG. 5 is an operational example of an asynchronous, concurrent prompting technique in accordance with some embodiments of the present disclosure.

FIG. 5 is an operational example 500 of an asynchronous, concurrent prompting technique in accordance with some embodiments of the present disclosure. As shown in the operational example 500, a model ensemble prompt request 402 may be received that identifies a first machine learning model 414A and a second machine learning model 414B.

At a first stage of the asynchronous, concurrent prompting technique, the model ensemble prompt request 402 may be divided into a plurality of asynchronous model prompts. The plurality of asynchronous model prompts may include a first asynchronous model prompt 424A for the first machine learning model 414A and a second asynchronous model prompt 424B for the second machine learning model 414B. The first asynchronous model prompt 424A may be provided to the first machine learning model 414A to generate a first candidate output 428A. The second asynchronous model prompt 424B may be provided to the second machine learning model 414B to generate a second candidate output 428B.

At a second stage of the asynchronous, concurrent prompting technique, the first candidate output 428A and the second candidate output 428B may be graded by each of the first machine learning model 414A and the second machine learning model 414B to select a candidate output from the plurality of candidate outputs. At the second stage, a first scoring prompt 430A may be generated for scoring the first candidate output 428A. The first scoring prompt 430A May be provided to the first machine learning model 414A and the second machine learning model 414B to generate a first and second candidate output score for the first candidate output 428A. In addition, or alternatively, a second scoring prompt 430B may be generated for scoring the second candidate output 428B. The second scoring prompt 430B may be provided to the first machine learning model 414A and the second machine learning model 414B to generate a first and second candidate output score for the second candidate output 428B. In some examples, a candidate output may be selected from the first candidate output 428A and the second candidate output 428B based on the candidate output scores for the first candidate output 428A and the second candidate output 428B.

In some examples, the second stage may implement an aggregation-based hallucination mitigation technique to select the candidate output. For instance, the first and second candidate output scores for the first candidate output 428A may be aggregated (e.g., through summation, mean, median) to generate an aggregated candidate output score for the first candidate output 428A. In addition, or alternatively, the first and second candidate output scores for the second candidate output 428B may be aggregated (e.g., through summation, mean, median) to generate an aggregated candidate output score for the second candidate output 428B. In some examples, a candidate output may be selected from the first candidate output 428A and the second candidate output 428B based on the aggregated candidate output scores for the first candidate output 428A and the second candidate output 428B.

In some examples, the asynchronous, concurrent prompting technique may include one or more automated error handling mechanisms. For example, the plurality of asynchronous model prompts (e.g., the first asynchronous model prompt 424A, the second asynchronous model prompt 424B) may be concurrently provided to the plurality of machine learning models (e.g., first machine learning model 414A, second machine learning model 414B), respectively. In some examples, a response time may be measured from the initiation of a request (e.g., asynchronous model prompt) to each of the machine learning models. A timeout may be detected in response to the response time exceeding a request time threshold. In response to a timeout, the machine learning model associated with the timeout may be removed from the modular model ensemble to prevent the model from interfering with the model ensemble prompt response. Other errors may also be detected, including a loss of access to a model, exceeding a processing and memory capacity limit, and/or the like. Each of these errors may be handled, in real time, by removing or disabling the model for a particular model ensemble prompt request.

As an example with respect to a timeout, a timeout may be detected for at least one of the plurality of machine learning models (e.g., the first machine learning model 414A, the second machine learning model 414B). Responsive to the timeout, the automated error handling mechanism may disable (e.g., remove the machine learning model from the modular model ensemble) the at least one machine learning model (e.g., first machine learning model 414A, second machine learning model 414B).

In some examples, the timeout (and/or other errors) may be detected based on one or more error thresholds, such as a request time threshold. The error thresholds may be associated with the user identifier (e.g., preset for a user profile), included in the model ensemble prompt request 402, and/or preset by the ensemble request handler. As one example, a request time threshold may correspond to a response time requested by the model ensemble prompt request. For instance, the request time threshold may be a derivative (e.g., a portion) of the response time that is designed to satisfy the response time (e.g., a five minute response time may necessitate a two minute request time threshold).

Figure 6:
FIG. 6 is a flowchart diagram of an example concurrent prompting process in accordance with some embodiments of the present disclosure.
Figure 6:
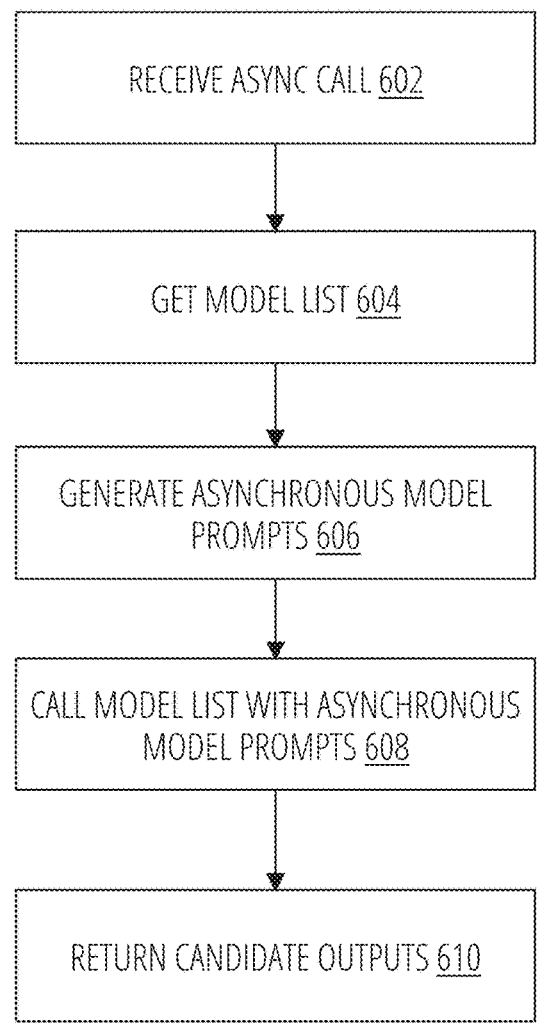

FIG. 6 is a flowchart diagram of an example concurrent prompting process 600 in accordance with some embodiments of the present disclosure. The flowchart diagram depicts a concurrent prompting technique that leverages a plurality of asynchronous model prompts to concurrently process a model ensemble prompt request. The process 600 may be implemented by one or more computing devices, entities, and/or systems described herein. For example, via the various steps/operations of the process 600, the computing system 101 may leverage the concurrent prompting techniques to effectively communicate across multiple machine learning models of a modular model ensemble. In this way, the process 600 may enable prompting to a plurality of machine learning models in parallel to receive a plurality of independently viable solutions to a prompt. By doing so, the process 600 allows for improved request handling in which a plurality of disparate models may be efficiently toggled and compared against one another to adaptively handle a request using the model that performs best for a particular solution.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, receiving an async call. For example, the computing system 101 may receive an async call. The async call, for example, may include a model ensemble prompt request that identifies a plurality of machine learning models for the concurrent prompting process 600. For instance, the computing system 101 may receive a model ensemble prompt request that includes a user identifier and a model prompt. In some examples, the user identifier may correspond to a user profile that identifies a user privilege level for each of a plurality of machine learning models.

In some embodiments, the process 600 includes, at step/operation 604, getting a model list. For example, the computing system 101 may retrieve a model list based on the model ensemble prompt request. The model list, for example, may include modular model ensemble that is generated to facilitate the model ensemble prompt request. For instance, the computing system 101 may generate, based on the user identifier of the model ensemble prompt request, a modular model ensemble that references a plurality of machine learning models. In some examples, the computing system 101 may generate the modular model ensemble based on the user privilege level for each of a plurality of machine learning models.

In some examples, the modular model ensemble may be tailored to a particular model ensemble prompt request. For instance, the plurality of machine learning models may include a first plurality of machine learning models. The computing system 101 may receive another model ensemble prompt request that includes another user identifier that is different than the user identifier. The computing system 101 may generate, based on the other user identifier, another modular model ensemble that references a second plurality of machine learning models different than the first plurality of machine learning models. In this way, a different modular model ensemble may be generated for each model ensemble prompt request to tailor the response outputs to the model ensemble prompt request.

In some examples, the computing system 101 may validate the model list (e.g., modular model ensemble). For instance, the computing system 101 may validate the model list to ensure a user has access to each model within the modular model ensemble.

In some embodiments, the process 600 includes, at step/operation 606, generating a plurality of asynchronous model prompts based on the model list. For example, the computing system 101 may generate the plurality of asynchronous model prompts based on the modular model ensemble. For instance, the computing system 101 may generate, based on the model prompt, a plurality of asynchronous model prompts for the plurality of machine learning models, respectively.

In some embodiments, the process 600 includes, at step/operation 608, calling the model list with the asynchronous model prompts. For example, the computing system 101 may execute the asynchronous model prompts with each of the machine learning models of the modular model ensemble. For instance, the computing system 101 may input the plurality of asynchronous model prompts to the plurality of machine learning models, respectively, to generate a plurality of candidate model outputs.

In some examples, the computing system 101 may concurrently provide the plurality of asynchronous model prompts to the plurality of machine learning models, respectively. In some instances, the computing system 101 may detect a timeout for at least one of the plurality of machine learning models. Responsive to the timeout, the computing system 101 may disable the at least one machine learning model for the particular model ensemble prompt request. In some examples, the timeout may be detected based on a request time threshold associated with the user identifier.

In some embodiments, the process 600 includes, at step/operation 610, returning candidate outputs provided by the plurality of machine learning models. For example, the computing system 101 may return the plurality of candidate outputs. In some examples, the computing system 101 may return a model ensemble prompt response with a selected output from the plurality of candidate outputs. The selected output may depend on the model ensemble prompt request. For example, the computing system 101 may select a selected output from a first plurality of candidate outputs provided by a first plurality of machine learning models based on a first model ensemble prompt request. In addition, or alternatively, the computing system 101 may output another model ensemble prompt response that includes a selected output from another plurality of candidate model outputs respectively generated by a second plurality of machine learning models. In this way, a response to a model ensemble prompt request may be tailored to the models identified by the request.

Figure 7:
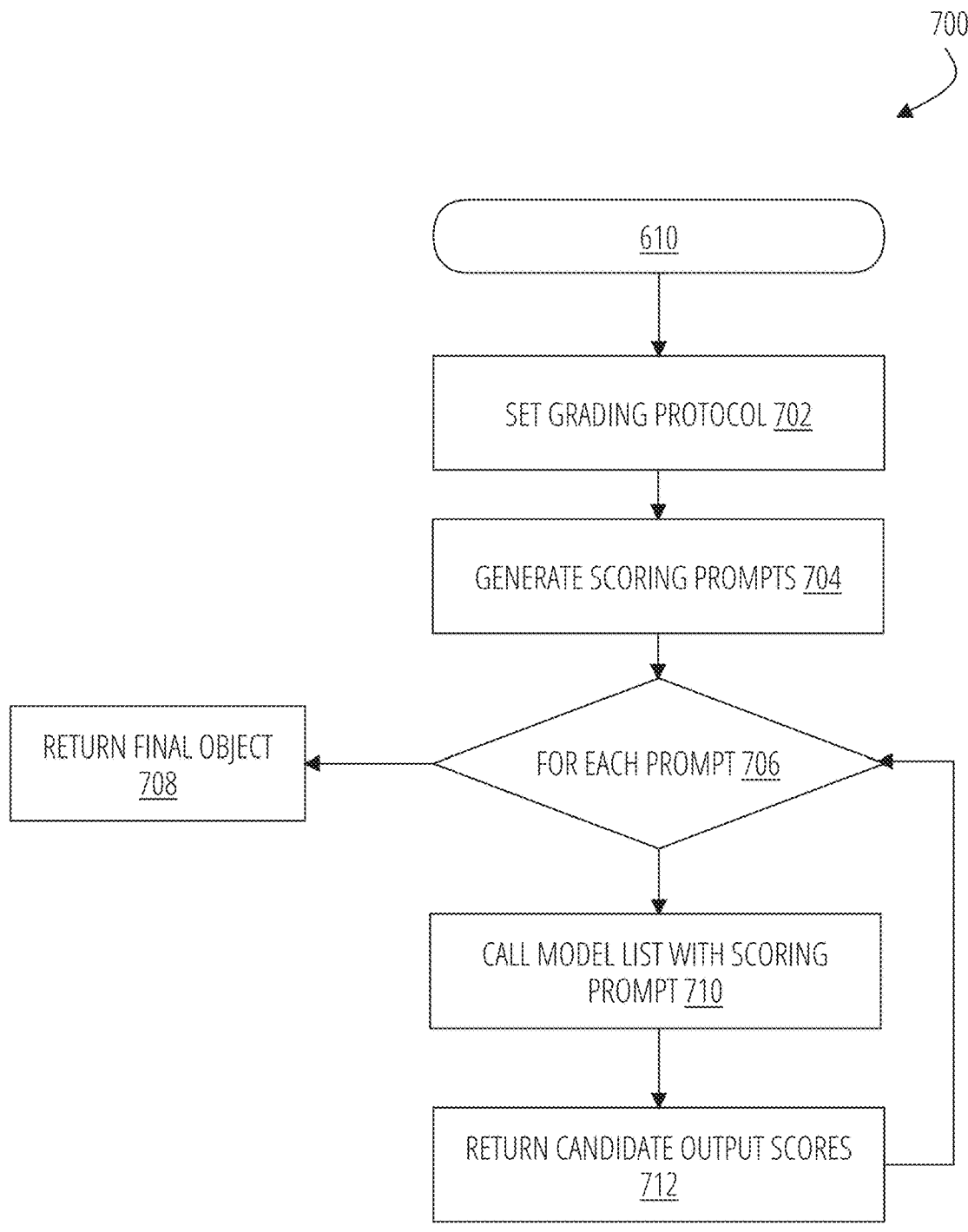
FIG. 7 is a flowchart diagram of an example aggregation-based hallucination mitigation process in accordance with some embodiments of the present disclosure.

FIG. 7 is a flowchart diagram of an example aggregation-based hallucination mitigation process 700 in accordance with some embodiments of the present disclosure. The flowchart diagram depicts a concurrent scoring technique that leverages a plurality of scoring prompts and machine learning models of a modular model ensemble to score a plurality of candidate outputs generated by the machine learning models. The process 700 may be implemented by one or more computing devices, entities, and/or systems described herein. For example, via the various steps/operations of the process 700, the computing system 101 may leverage the concurrent scoring techniques to effectively evaluate a plurality of candidate outputs. By doing so, the process 700 improve computer functionality by improving outputs of a machine learning model to specifically address hallucination, accuracy, and other technical challenges with traditional generative machine learning models.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 may begin after step/operation 610 of the process 700, where the process 700 include returning a plurality of candidate outputs. The process 700 may be performed to select an output from the plurality of candidate outputs as a response to an async call. The selected output may minimize hallucinations, improve accuracy, and/or the like to tailor a model response to a set of scoring instructions associated with the async call (e.g., model ensemble prompt request).

In some embodiments, the process 700 includes, at step/operation 702, setting a set grading protocol 702 for a plurality of candidate outputs. For example, the computing system 101 may identify a set of scoring instructions for the plurality of candidate outputs. In some examples, the set of scoring instructions may be based on a user identifier of a model ensemble prompt request. In addition, or alternatively, the model ensemble prompt request may include the set of scoring instructions. In some examples, the set of scoring instructions may measure a hallucination level reflected by the candidate output.

In some embodiments, the process 700 includes, at step/operation 704, generating scoring prompts. For example, the computing system 101 may generate a scoring prompt for each of the candidate outputs. For instance, each scoring prompt may include a set of scoring instructions and a respective candidate output. In some examples, the scoring prompt may further include model data that identifies a model name, a model type, and/or the like associated with a machine learning model that outputs the candidate output.

In some embodiments, the process 700 includes, at step/operation 706, a candidate output may be selected for a scoring sub-process. For example, the computing system 101 may select candidate output from the plurality of candidate outputs for a scoring process. In the event that an unscored candidate output exists, the process 700 may proceed to step/operation 710 to initiate the scoring sub-process. Otherwise, the process 700 may proceed to step/operation 708 to return a final object (e.g., model ensemble prompt response with selected output).

In some embodiments, the process 700 includes, at step/operation 710, calling a model list with the scoring prompt for the candidate output For example, the computing system 101 may input the scoring prompt for each of the plurality of candidate outputs to each of the plurality of machine learning models.

In some embodiments, the process 700 includes, at step/operation 712, returning a plurality of candidate output scores for the candidate output. For example, the computing system 101 may generate, using the plurality of machine learning models, a plurality of candidate output scores for each candidate output of the plurality of candidate model outputs. In some examples, each of the candidate output scores may include a numerical value. The computing system 101 may aggregate the plurality of candidate output scores to generate an aggregated candidate output score.

In some embodiments, the process 700 includes, at step/operation 708, return a return final object based on the candidate output scores generated for each of the plurality of candidate outputs. For example, the computing system 101 may output a model ensemble prompt response including a selected output from the plurality of candidate model outputs. For instance, the computing system 101 may select the selected output based on the plurality of candidate output scores. In some examples, the computing system 101 may select the selected output based on a comparison between the aggregated candidate output score and a plurality of aggregate candidate output scores respectively corresponding to the plurality of candidate model outputs.

Some techniques of the present disclosure enable the generation of action outputs that may be performed to initiate one or more real world actions to achieve real-world effects. The techniques of the present disclosure may be used, applied, and/or otherwise leveraged to manage machine learning requests to generate actionable insights, instructions, and/or the like. In some examples, the responses of the present disclosure may trigger action outputs (e.g., through control instructions) to automate computer performance actions and/or the like. The action outputs may control various aspects of a client device, such as the display, transmission, and/or the like of data reflective of an alert, and/or the like. The alert may be automatically communicated to a user and/or may be used to initiate a security protocol (e.g., locking a computer), a robotic action (e.g., performing an automated screening process), and/or the like.

In some examples, the computing tasks may include actions that may be based on an information domain. An information domain may include any environment in which computing systems may be applied to interpret, store, and process data and initiate the performance of computing tasks responsive to the data. These actions may cause real-world changes, for example, by controlling a hardware component, providing alerts, interactive actions, and/or the like. For instance, actions may include the initiation of automated instructions across and between devices, automated notifications, automated scheduling operations, automated precautionary actions, automated security actions, automated data processing actions, and/or the like.

IV. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by a differential request handling engine, a model ensemble prompt request comprising a model prompt;

inputting, via a concurrent prompting technique of the differential request handling engine, a plurality of asynchronous model prompts, derived from the model prompt, to a modular model ensemble to receive a plurality of candidate model outputs;

inputting, via a concurrent scoring mechanism of the differential request handling engine, a scoring prompt comprising a candidate model output of the plurality of candidate model outputs to the modular model ensemble to receive a plurality of candidate output scores, wherein a candidate output score of the plurality of candidate output scores is based on a hallucination level reflected by the candidate model output; and outputting, by the differential request handling engine, a model ensemble prompt response comprising a selected output from the plurality of candidate model outputs based on the plurality of candidate output scores.

2. The computer-implemented method of claim 1, wherein the scoring prompt comprises a set of scoring instructions and the candidate model output.

3. The computer-implemented method of claim 2, wherein the scoring prompt further comprises model data that identifies a model name or a model type associated with a machine learning model that outputs the candidate model output.

4. The computer-implemented method of claim 2, wherein the set of scoring instructions is based on a user identifier corresponding to the model ensemble prompt request.

5. The computer-implemented method of claim 2, wherein the model ensemble prompt request comprises the set of scoring instructions.

6. The computer-implemented method of claim 2, wherein the set of scoring instructions measure the hallucination level reflected by the candidate model output.

7. The computer-implemented method of claim 1, wherein each of the plurality of candidate output scores comprises a numerical value and selecting the selected output comprises:

aggregating the plurality of candidate output scores to generate an aggregated candidate output score; and selecting the selected output based on a comparison between the aggregated candidate output score and a plurality of aggregate candidate output scores respectively corresponding to the plurality of candidate model outputs.

8. The computer-implemented method of claim 1, wherein the model ensemble prompt request comprises a user identifier that corresponds to a user profile that identifies a user privilege level for each of a plurality of machine learning models and the modular model ensemble comprising one or more of the plurality of machine learning models based based on the user privilege level.

9. The computer-implemented method of claim 8, wherein the plurality of machine learning models is a first plurality of machine learning models, and the computer-implemented method further comprises:

receiving another model ensemble prompt request; and outputting another model ensemble prompt response comprising a selected output from another plurality of candidate model outputs respectively received from a second plurality of machine learning models referenced by another modular model ensemble different from the modular model ensemble.

10. The computer-implemented method of claim 1, wherein the plurality of asynchronous model prompts is concurrently provided to one or more machine learning models within the modular model ensemble and the computer-implemented method further comprises:

detecting a timeout for at least one machine learning model of the modular model ensemble; and responsive to the timeout, disabling the at least one machine learning model.

11. The computer-implemented method of claim 10, wherein the timeout is detected based on a request time threshold associated with a user identifier of the model ensemble prompt request.

12. A system comprising memory and one or more processors communicatively coupled to the memory, the one or more processors configured to:

receive, by a differential request handling engine, a model ensemble prompt request comprising a user identifier and a model prompt;

input, via a concurrent prompting technique of the differential request handling engine, a plurality of asynchronous model prompts, derived from the model prompt, to a modular model ensemble to receive a plurality of candidate model outputs;

input, via a concurrent scoring mechanism of the differential request handling engine, a scoring prompt comprising a candidate model output of the plurality of candidate model outputs to the modular model ensemble to receive a plurality of candidate output scores, wherein a candidate output score of the plurality of candidate output scores is based on a hallucination level reflected by the candidate model output; and output, by the differential request handling engine, a model ensemble prompt response comprising a selected output from the plurality of candidate model outputs based on the plurality of candidate output scores.

13. The system of claim 12, wherein the scoring prompt comprises a set of scoring instructions and the candidate model output.

14. The system of claim 12, wherein the scoring prompt further comprises model data that identifies a model name or a model type associated with a machine learning model that outputs the candidate model output.

15. One or more non-transitory computer-readable storage media including instructions that, when executed by one or more processors, cause the one or more processors to:

receive, by a differential request handling engine, a model ensemble prompt request comprising a user identifier and a model prompt;

input, via a concurrent prompting technique of the differential request handling engine, a plurality of asynchronous model prompts, derived from the model prompt, to a modular model ensemble to receive a plurality of candidate model outputs;

input, via a concurrent scoring mechanism of the differential request handling engine, a scoring prompt comprising a candidate model output of the plurality of candidate model outputs to the modular model ensemble to receive a plurality of candidate output scores, wherein a candidate output score of the plurality of candidate output scores is based on a hallucination level reflected by the candidate model output; and output, by the differential request handling engine, a model ensemble prompt response comprising a selected output from the plurality of candidate model outputs based on the plurality of candidate output scores.

16. The one or more non-transitory computer-readable storage media of claim 15, wherein the plurality of asynchronous model prompts is concurrently provided to one or more machine learning models of the modular model ensemble and the one or more processors are further caused to:

detect a timeout for at least one machine learning model of the one or more machine learning models; and
    responsive to the timeout, disable the at least one machine learning model.

17. The computer-implemented method of claim 1, wherein the modular model ensemble defines each of one or more machine learning models as nodes that may be interconnected to facilitate voting across each of the one or more machine learning models within the modular model ensemble.

18. The computer-implemented method of claim 1, wherein the differential request handling engine is executed on a client device and each of one or more machine learning models within the modular model ensemble is executed on a remote device separate from the client device, and the computer-implemented method further comprises:

detecting, via an automated error handling mechanism of the differential request handling engine, an error associated with a machine learning model of the modular model ensemble; and
    automatically disabling, via the automated error handling mechanism of the differential request handling engine, the machine learning model within the modular model ensemble to prevent a single point of failure at the client device.

\* \* \* \* \*